United States Patent [19]

Brems

[11] 4,223,880

[45] Sep. 23, 1980

[54] WORK CLAMP AND PALLET COMBINATION

[76] Inventor: John H. Brems, 32867 White Oaks Trail, Birmingham, Mich. 48010

[21] Appl. No.: 918,528

[22] Filed: Jun. 23, 1978

[51] Int. Cl.³ .............................................. B25B 1/04
[52] U.S. Cl. .................................. 269/101; 269/239; 269/94
[58] Field of Search ...................... 269/94, 91, 93, 49, 269/100, 238, 321 A, 101, 239

[56] References Cited

U.S. PATENT DOCUMENTS

| 781,356 | 1/1905 | Peelman | 269/91 |
|---|---|---|---|
| 4,148,470 | 4/1979 | Kolnes et al. | 269/101 |

Primary Examiner—Othell M. Simpson
Assistant Examiner—Roscoe V. Parker
Attorney, Agent, or Firm—Barnes, Kisselle, Raisch & Choate

[57] ABSTRACT

A work holder pallet or fixture for carrying a workpiece from station to station in a sequential machining line in combination with a workpiece clamp loosely carried by the pallet in a manner to permit loading and unloading of the pressure and the application of pressure to a workpiece to hold it against the pallet with a force developed by the clamp without any distortion reaction forces on the pallet.

13 Claims, 14 Drawing Figures

WORK CLAMP AND PALLET COMBINATION

FIELD OF THE INVENTION

This invention relates to a method of clamping workpieces into a pallet or fixture where a pallet is defined as a locating frame for the support, location, and clamping of a workpiece, which is movable from station to station of a multistation machine; and a fixture is defined as a locating frame for the support, location, and clamping of a workpiece which is an integral portion of a given machine; and in which a machine is defined as a mechanism for performing some operation on a given workpiece, such as metal removal, which requires accurate location of the workpiece with respect to the operating elements of the machine.

BACKGROUND OF THE INVENTION

In a transfer machine for performing, at special stations, a number of operations on a work part, the part is usually carried by the pallet from the station. The pallet is precisely positioned at a particular station and clamped while the particular operation on the workpiece is carried out, whether it be milling or drilling, etc. Sometimes a "soft" clamp is used for the pallets, namely, a clamp which is opened mechanically and closed with a spring. Other instances include a "hard" clamp wherein the clamp is possibly opened by a spring but closed with a mechanical motion or hydraulically. The pallet usually slides on transfer rails extending through the machine.

The work part must also be clamped on the pallet. Since the parts are sometimes quite heavy and must be well secured, heavy clamping pressures are applied. One of the problems which has arisen in the art is the uneven wearing of the transfer rails at edge portions. I have discovered that part of this undesirable wear has resulted from distortion of the pallets by the clamping pressure. The tighter the clamp, the greater the distortion and the greater the line or spot wear on the transfer rails.

OBJECTS OF THIS INVENTION

It is one object of this invention to provide a means of clamping the workpiece into the pallet or fixture such that the bending forces of clamping are confined to members not associated with the location of the workpieces.

It is a further object of this invention to provide a means for clamping in which the forces of clamping create no applied bending loads to the fixture or pallet frame, and thereby the deflection of these pallets or frames is minimized, and any deflections do not cause bending of the frames.

Other objects and features of the invention will be apparent in the following description and claims in which the principles of the invention are set forth, together with a detailed description of the embodiments to enable persons skilled in the art to practice the invention, all in connection with the best mode presently contemplated for the invention.

BRIEF DESCRIPTION OF THE DRAWINGS

DRAWINGS accompany the invention and the various views thereof may be briefly described as.

DESCRIPTION OF CLAMPS PRESENTLY IN USE

Figure 1:
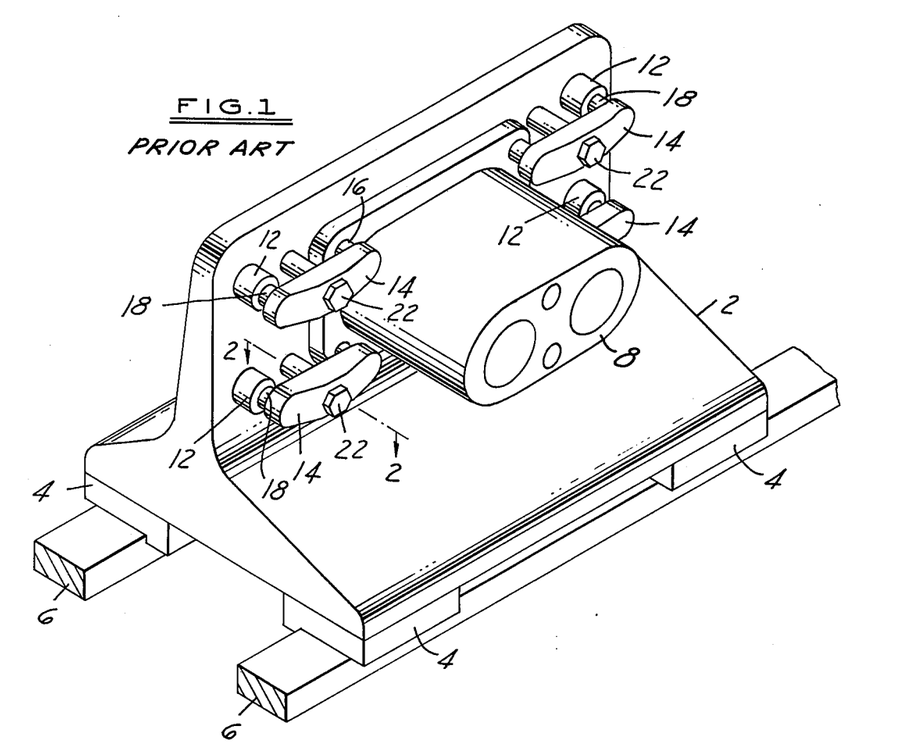
FIG. 1, a perspective view of clamps used in the present state of the art.

In FIG. 1 is shown a typical prior art pallet carrying a workpiece as it is progressively transferred through the multiple stations of a transfer machine. The pallet frame 2 comprises a heavy cast or fabricated structure on which are mounted four pallet feet 4, which are generally designed as hardened steel replaceable pads. The pallet feet 4 support the pallet 2 on two parallel steel transfer rails 6 which are suitably supported from the machine frame. It will be understood that the pallet frame is slid along the transfer rails from machine station to machine station by a suitable pallet transfer mechanism, not shown. It will be further understood that in any given operating station in the machine, the pallet frame is suitably located and clamped with respect to the transfer rails and machine frame.

Figure 2:
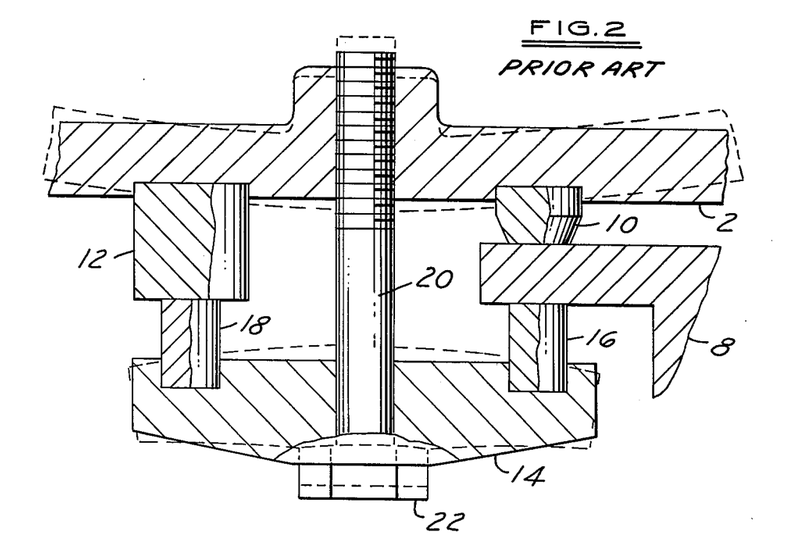
FIG. 2, a sectional view on line 2—2 of FIG. 1.

Four substantially identical clamp assemblies are mounted to the pallet frame 2 for clamping a workpiece 8 into the pallet; a section through one of these clamp assemblies is shown in FIG. 2. Each clamp assembly consists of a support pad 10 and a reaction pad 12 mounted in the pallet frame 2; the support pad 10 is contoured to the mating surface of the workpiece 8 and is related to the support pads of the other clamp assemblies such as to provide a stable support for the workpiece 8. A movable clamp bar 14 carries a clamp pad 16 and a fulcrum pad 18 and is connected to the pallet frame through a clamp screw 20. The face of the clamp pad 16 is contoured locally to conform to the mating surface of the workpiece 8.

To clamp the workpiece 8 to the pallet frame, the screw 20 is tightened into the pallet frame 2, through its hexagonal head 22, either manually or by an automatic clamp operation which drives the screw to a given preset torque value. The clamp bar 14 acts as a lever and applies a force on both the workpiece 8 and the reaction pad 12; this force system, created by tension in screw 20, is carried as a bending load in the clamp bar 14 and in a section of the pallet frame 2 between the support pad 10 and the reaction pad 12. The dotted lines in FIG. 2 show, in exaggerated scale, the deflection of the clamp bar 14 and the aforesaid section of the pallet frame 2, due to these applied bending loads.

To unclamp the workpiece 8 from the pallet frame 2, the screw 20 is backed out, either manually, or by an automatic screw rotating driver, until clearance develops between the clamp pad 16 and the workpiece 8. The clamp bar 14 is then rotated about the axis of the screw 20, either manually or by an automatic rotating device, through an angle of approximately 90°, which rotation generates the clearance required for the unloading of the workpiece 8 from the pallet, and the reloading of a new workpiece into the pallet, either manually or by an automatic loading and unloading system.

The foregoing description of a system to clamp a workpiece into a pallet is intended to illustrate the basic elements in present common usage. Variations, modifications and additions may be employed. In some cases, a compression spring is mounted concentrically on the screw 20 between the pallet frame 2 and the clamp bar 14 to move the clamp bar 14 outward with the screw head 22 during unclamping. In some cases the clamp pad 16 is made integral with the clamp bar 14; and/or the fulcrum pad 18 is made integral with the clamp bar 14. In still other designs, the screw 20 is replaced with a stud permanently attached to the pallet frame 2 and a nut is threaded on this stud to apply the clamping force on the clamp bar 14.

But independent of the detail design of this general type of clamping system, it can be seen that the pallet frame 2 is subjected to bending loads. To minimize deflections due to these bending loads, large sections are employed for the pallet frame 2, but this only decreases the problem rather than eliminating it. Bending deflections in the pallet are objectionable for several basic reasons. They compromise the accurate placement of the workpiece 8; as the pallet deflects, it will induce deflections in the workpiece itself (and it is very objectionable to do machining on a deflected workpiece since this leads to errors when the workpiece is subsequently unclamped and undeflected); and local bending deflections in the pallet can create sufficient overall pallet warpage to disturb the area contact between the pallet feet 4 and machine transfer rails 6. Non-uniform contact between these pallet feet 4 and transfer rails 6 leads to more rapid wear of both items.

DETAILS OF THE PRESENT INVENTION

Figures 3, 4:
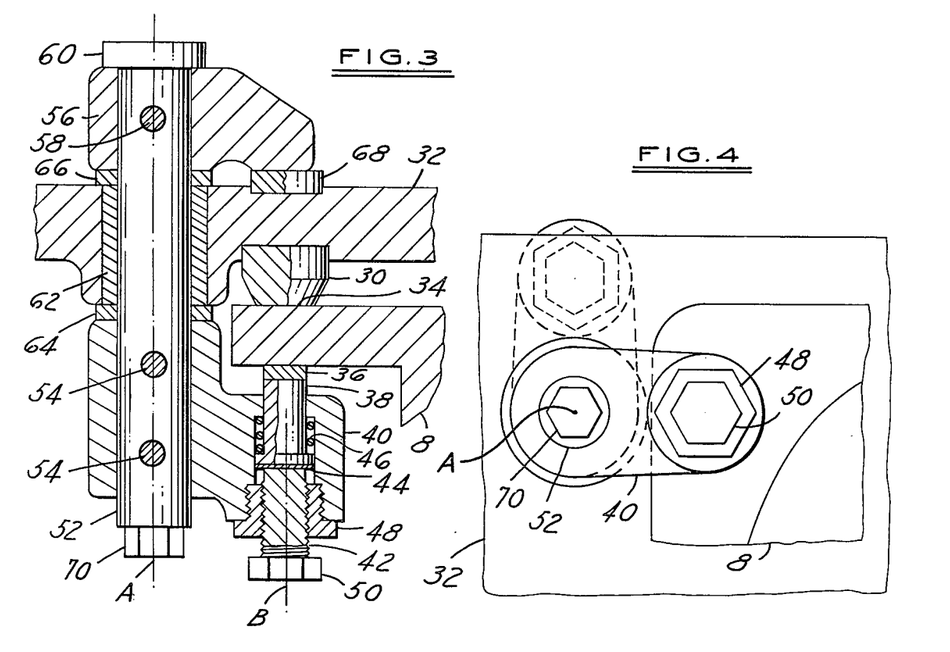
FIG. 3, a sectional view of a first embodiment of the present invention.
FIG. 4, a bottom view of the structure illustrated in FIG. 3.

In FIG. 3 is shown a section of one embodiment of this invention which eliminates all reactive bending loads in the pallet frame. It will be noted that the workpiece to pallet configuration is substantially the same as in FIG. 2. A rest pad 30 is mounted to the pallet frame 32; this provides the surface 34 against which the workpiece 8 is located. A clamping force is applied to the workpiece 8 by a pressure pad 36 on the end of a plunger 38 guided in a yoke 40. Clamp pressure is applied by a screw 42 which actuates the plunger 38 through a wear pad 44 and against a retraction spring 46; the screw 42 is threaded through an adapter 48 also mounted in the yoke 40; the screw 42 is fitted with a hexagonal head 50 for actuation by an automatic torque limiting nut runner.

The yoke 40 is mounted to a rod 52 through two cross pins 54. The rod 52 extends through the pallet frame 32 and supports a reaction yoke 56 through a pin 58 and a shouldered head 60 on the rod 52. The rod 52 is located within the pallet frame 32 by a resilient bushing 62 made of a suitable elastomer such as neoprene or polyurethane. The assembly of the rod 52 and yokes 40 and 56 is axially positioned with respect to the pallet frame 32 by two relatively thick resilient thrust washers 64 and 66. During clamping, the reaction yoke 56 bears against a wear pad 68 mounted on the pallet frame 32 directly in line with the pad 30 on the clamp axis B. The rod 52 may be rotated on axis A through a hexagonal driver 70 formed into its one end.

During loading and unloading of the workpiece, the subassembly made up of rod 52, yokes 40 and 56, and all the components mounted thereon, which will be subseqently referred to as the "C" assembly, is rotated about the axis A of the rod 52 so that it is in the position shown by the dotted lines in FIG. 4. After a workpiece is loaded, the "C" assembly is rotated back about axis A until the pad 36 is in line with the rest pad 30. The C assembly is then in the position shown in solid lines in FIG. 4; this rotation may be accomplished manually, or by an automatic system comparable to one that might be used to rotate the clamp or bar 14 in FIG. 2.

With the C assembly so aligned, an automatic drive system moves in to rotate the screw 42 through its hexagonal head 50 to a given torque value; this is again common practice such as is used for the screw 20 in FIG. 2. The workpiece 8 is clamped against the pad 30 by the force generated by screw 42. The reactive force on the screw 42 is transmitted through the yoke 40, rod 52, and yoke 56 to the pad 68, where this reactive force is applied to the pallet frame 32 directly in line with and behind the clamp force applied to the workpiece 8 by the pad 30. Stated another way, the clamp force system applies no bending load on the pallet frame. The only load due to clamping which is experienced by the pallet frame 32 is a pure compressive load between the two pads 30 and 68.

The C assembly experiences a large degree of bending load which is superimposed on a tensile load on rod 52 which is equal to the compressive load between pads 30 and 68. A large degree of deflection is therefore found in the C assembly, but it is designed so that the loads are well within its elastic limit. The deflections within the C assembly can be transmitted to the pallet frame 32 only through the elastomeric bushing 62 and washers 64 and 66. These have a very low modulus of elasticity so that the forces transmitted to the pallet frame due to the deflection of the C assembly are totally negligible.

The unclamping sequence is the inverse of the clamping sequence. The automatic nut runner backs out the screw 42 with respect to the yoke 40 as driven by a nut runner engaging hex 50. As the screw 42 withdraws, the spring 46 returns the plunger 38 and pad 36 to provide ample clearance to swing the C assembly clear for unloading and subsequent reloading.

Figure 5:
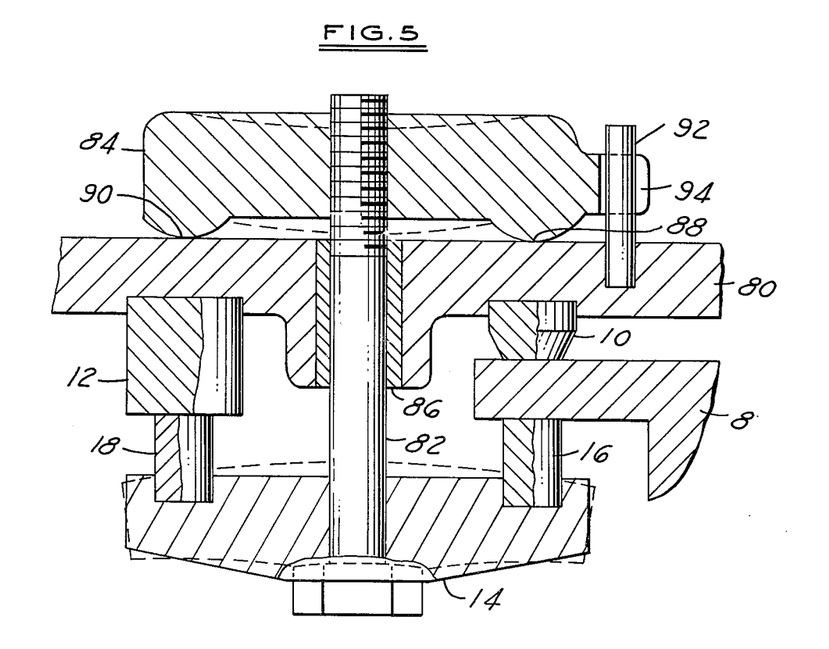
FIG. 5, a second embodiment of the invention.

A second embodiment of this same invention, using some of the same components of the common clamp design of FIGS. 1 and 2, is shown in FIG. 5. A section of the fixture or pallet frame 80 supports a locator pad 10 for the workpiece 8. The workpiece 8 is clamped against this locator pad 10 through a clamp bar 14 to which is mounted a clamp pad 16. The opposite end of the clamp bar 14 through fulcrum pad 18 bears against a reaction pad 12 mounted in the pallet frame 80. The clamping load is applied near the midpoint of the clamp bar by a screw 82. The function, operation, and sequencing of the clamp bar 14 is substantially the same as in the reference clamping mechanism of FIG. 2. However, it will be noted that in the mechanism of FIG. 5, the force applying mechanism, screw 82 does not screw directly into the pallet 80, but passes through it to screw into a reaction bar 84. The screw 82 is guided with respect to the pallet frame 80 by a resilient bushing 86 which may be neoprene, polyurethane or an equivalent elastomer, or merely an oversize hole in pallet frame 80. The bar 84 is undercut between portions 88 and 90 which bear on the pallet frame directly in line with the clamping and fulcrum points of the clamp bar 14. A pin 92 mounted in pallet frame 80 engages a loose fitting slot 94 in bar 84 to react the torque applied to the bar 84 by screw 82.

As the clamp screw 82 is turned down to create a clamp force on workpiece 8 against pad 10, a large bending load is applied to clamp bar 14. This bending load is not reacted by the pallet frame 80 but is reacted instead by the reaction bar 84. Bars 14 and 84 can and will deflect without causing any bending deflection in the pallet frame 80. The dotted lines in FIG. 5 show, in exaggerated scale, the deflections of the bars 14 and 84 at full clamp load, and it can be seen that these deflections create no applied bending load to the pallet frame 80. The only loads experienced by the pallet frame 80 consist of two pure local compressive loads: the first exists between surface 88 of reaction bar 84 and the pad 10, and the second between surface 90 of reaction bar 84 and the pad 12. These substantially pure compressive loads create far less deflection in the pallet frame 80 than the bending loads which would be experienced in the absence of the reaction bar 84.

Figure 6:
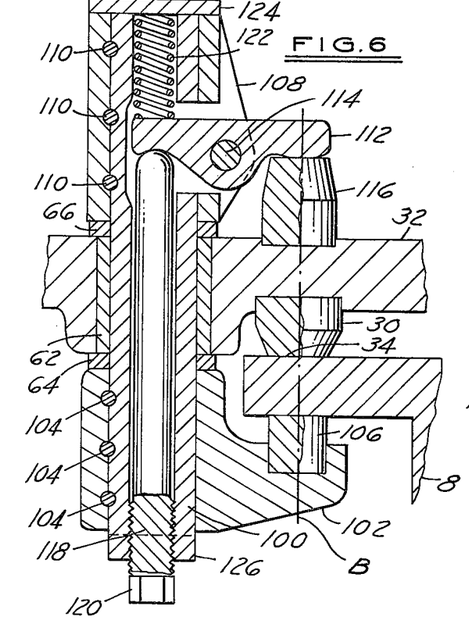
FIG. 6, a third embodiment of a "C" type clamp.

In FIG. 6, another embodiment is shown in which the clamping force on the workpiece is applied without inducing a reactive bending moment on the pallet frame, and in which the means for applying the clamping force and the means for rotating the clamp assembly for loading and unloading clearance are coaxial.

The pallet frame 32 still supports a pad 30 having a surface 34 which locates the workpiece 8. The clamp assembly is made up of a tubular body 100 mounted in the pallet frame 32 through resilient bushing 62 and resilient washers 64 and 66. A front yoke 102 is fastened to the body 100 by pins 104, and supports a clamp pad 106.

On the other side of the pallet frame, a rear yoke 108 is fastened to the tubular body 100 by pins 110. The rear yoke 108 in turn supports a clamp lever 112 through a pivot pin 114 on which the lever 112 may pivot with respect to the yoke 108. The outboard end of the lever 112 bears against the face of a reaction pad 116 in line with the clamp pad 106. The inboard end of the lever 112 is contacted and driven by a clamp rod 118 which is threaded into the body 100 and rotated through a hexagonal head 120. A spring 122 is mounted within the body 100 on the other side of lever 112 and is held in place by cap 124 attached to body 100. The spring 122 keeps the lever 112 in contact with rod 118. Finally, the body 100 is provided with a hexagonal drive surface 126 substantially coaxial with the rod hex 120.

For loading and unloading, the clamp assembly is rotated approximately 90° about the axis of the body 100 from the position shown in FIG. 6. For clamping, the clamp assembly is positioned as shown in FIG. 6, and the clamp force is applied by rotating the rod 118 through hex 120 causing the rod 118 to move toward lever 112. This causes the lever 112 to rotate in a clockwise direction about pin 114 exerting a squeezing or clamping force between pad 106 and the face of lever 112 which contacts pad 116. It is easily seen that the only force exerted on the pallet frame is the compressive force exerted along the clamping axis B. The clamp body 100, yokes 102 and 108, and lever 112, can and will deflect due to the bending loads imposed on them, but these deflections will be absorbed by the resilient bushing 62 and washers 64 and 66 while applying totally negligible forces on the pallet frame 32.

For unclamping, the rod 118 is rotated in the opposite direction in body 100 moving it away from the end cap 124. The lever 112 rotates counterclockwise about pin 114 is driven by spring 122 releasing the clamp force and creating clearance between lever 112 and pad 116.

Figure 7:
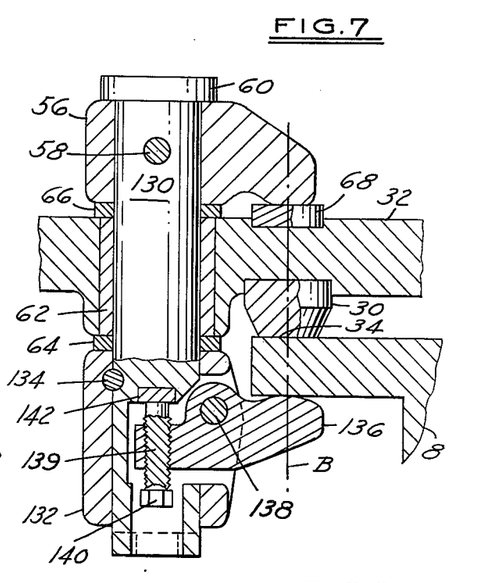
FIG. 7, an inverted force applicator.

In FIG. 7, another embodiment using an internal pivoted lever is shown; in this instance, the lever is mounted on the workpiece side of the pallet as opposed to on the opposite side as shown in FIG. 6.

Referring to FIG. 7, the pallet frame 32 again supports a pad 30, whose locating surface 34 locates the workpiece 8. The clamp body 130 is again positioned in the pallet frame 32 through resilient bushing 62, and resilient washers 64 and 66. As in the embodiment of FIG. 3, a rear yoke 56 is attached to body 130 through a pin 58 and reacts against a pad 68 in pallet frame 32; the rear yoke is further supported by a shouldered section 60 on body 130.

A front yoke 132 is attached to the body 130 by pin 134. This yoke 132 in turn supports a clamp lever 136 through a pivot pin 138, and the outboard end of lever 136 is contoured to contact the workpiece 8 on the clamp axis B. The inboard end of the lever 136 has threaded through it a loading screw 139, fitted with a hexagonal drive head 140; this screw 139 bears against a wear pad 142 mounted in the body 130.

Loading and unloading is again accomplished by having the clamp assembly rotated clear of the workpiece. Clamping is accomplished in the angular position shown by rotating the screw 139 towards the wear pad 142. The screw cannot move axially, and this forces the lever 136 to rotate counterclockwise on pin 138 creating a clamp force on workpiece 8 along axis B. It can be seen that this force is reacted by the pad 68 and yoke 56 and that the entire clamp assembly creates only a compressive load along the clamp axis B and imposes no bending loads on the pallet frame 32. The clamp assembly will itself deflect but this is absorbed by the resilience of bushing 62 and washers 64 and 66.

To unclamp, the screw 139 is turned to move it away from the wear pad 142, permitting the lever 136 to rotate clockwise about pin 138. A suitable spring may be added to assist in this movement.

Figure 8:
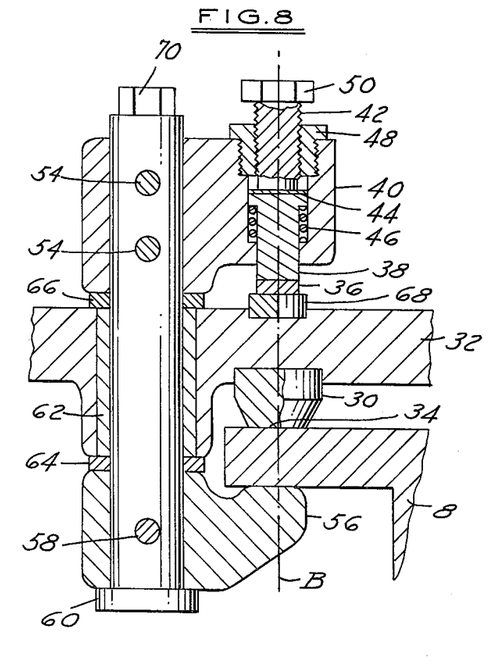
FIG. 8, a modified force application screw location.

In all of the previous embodiments, the rotation of the clamp assembly and the actuation of the screw to create the clamp force were accomplished from the same side of the pallet frame as the side on which the workpiece was located. These functions can be accomplished from the opposite side of the pallet as is illustrated in FIG. 8 which is substantially the same assembly as shown in FIG. 3 except that the entire clamp assembly is reversed with respect to the pallet frame 32, and minor alterations are made in the dimensional characteristics of some components. The workpiece 8 is now clamped against the face 34 of the pad 30 by the yoke 56 as a reaction to the force applied by the screw 42 through plunger 38 to pad 68. It can be seen, therefore, that the clamp assembly shown in FIG. 8 again exerts only a compressive load on the pallet frame 32 along the axis B in clamping the workpiece 8 to the pallet.

Figure 9:
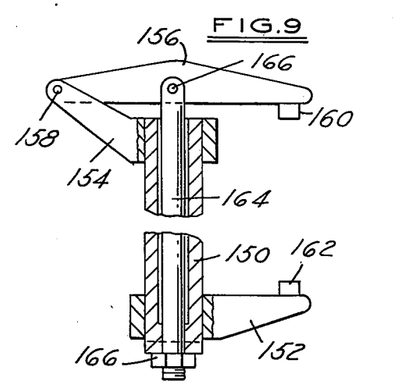
FIG. 9, a simplified diagrammatic presentation of a pivoted lever type clamp.

FIG. 9 is a simplified schematic drawing showing still another version of a pivoted lever type clamp arrangement. A tubular clamp body 150 supports a fixed yoke 152 and a fixed bracket 154. It will be understood that the body 150 is again mounted in the pallet frame with appropriate resilient bushings and washers. A clamp lever 156 is connected to the bracket 154 through a pivot pin 158; at its other end the lever 156 carries a clamp pad 160 directly in line with a clamp pad 162 mounted on yoke 152. An actuator rod 164 extends through the center of the body 150 and is pivotally connected to the lever 156 through a pin 166 at one end; at its other end, the rod 164 is threaded and carries a nut 167 which bears against the end face of body 150. It can be seen that as the nut 166 is screwed down on rod 164, it causes rod 164 to move towards the fixed yoke, and causes lever 160 to rotate clockwise about pin 158 decreasing the distance between pads 160 and 162. With an appropriate interelationship with respect to a pallet frame and workpiece, this can be used to clamp the workpiece into the pallet frame, again creating only compressive loads in said pallet frame.

Figure 10:
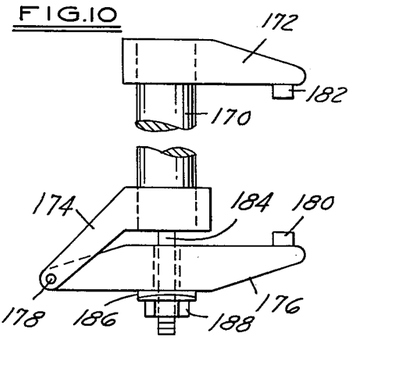
FIG. 10, a second embodiment of a lever type clamp.

Another version of a lever type self-contained clamp system is shown in FIG. 10. A cylindrical clamp body 170 supports a fixed yoke 172 at one end and a fixed bracket 174 at the other end; it will again be understood that the clamp body 170 is supported in a pallet frame by appropriate resilient bushings and washers. A clamp lever 176 is pivotally connected to the bracket 174 by a pivot pin 178; at its other end, the lever 176 carries a clamp pad 180 directly in line with a clamp pad 182 mounted to the fixed yoke. A stud 184 is mounted to the clamp body 170 and extends through an oversize hole in lever 176 and through a spherical washer 186; the outboard end of stud 184 is threaded and carries a nut 188. As this nut 188 is tightened on stud 184, it moves towards the body 170 and, through the spherical washer 186, it causes the clamp lever 176 to rotate counterclockwise on pin 178, decreasing the distance between pads 180 and 182. Again with an appropriate relationship with respect to the pallet frame and workpiece, this can be used to clamp the workpiece into the frame, again creating only compressive loads in the pallet frame.

In all of the embodiments illustrated, the clamping force has been generated, directly or indirectly, by a screw and thread system, but other means of force generation are also usable within the spirit of the invention, whose primary objective it is to eliminate the reactive bending loads within the pallet or fixture frame caused by workpiece clamping. Two alternate means of clamping force generation are illustrated in FIGS. 11 and 12.

Figure 11:
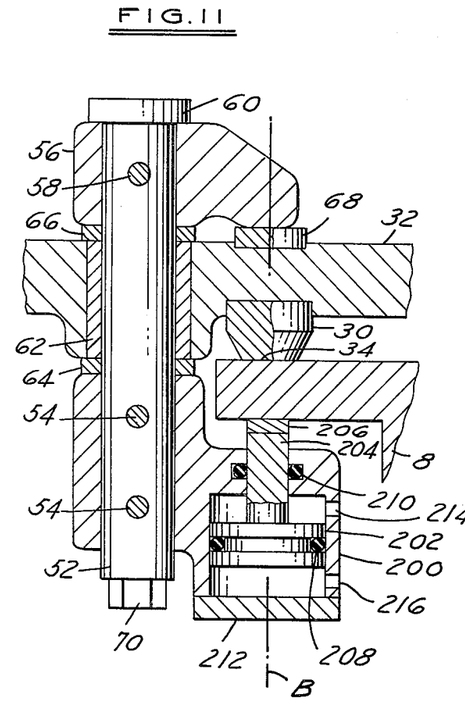
FIG. 11, a clamp similar to that of FIG. 3 with a fluid actuator.

Referring to FIG. 11, the basic clamp body 52, rear yoke 56, and other details are the same as in the clamp assembly of FIG. 3. The front yoke 200 is revised to incorporate a cylinder rather than the screw mechanism of FIG. 3. The front yoke is bored out with a cylindrical cavity in which is mounted a piston 202 and piston rod 204, whose forward end carries a pressure pad 206. The piston 202 is provided with a seal 208, and the rod 204 is sealed with a seal 210. The cylindrical cavity in the yoke 200 is closed with a cover plate 212, and the cylinder portions on either side of the piston are provided with ports 214 and 216. It can be seen that when a fluid under pressure from a pump or accumulator is introduced into port 216, the piston 202, rod 204, and pressure pad move toward the workpiece 8 and clamp it against face 34 of pad 30. The reaction force is transmitted through the clamp assembly to appear at pad 68, again applying only a simple compressive force on pallet frame 32. It can further be seen that when fluid under pressure is introduced into port 214, the piston 202, rod 204, and pad 206 withdraw from the workpiece 8 permitting the clamp assembly to be rotated about the axis of rod 52 by the hexagonal section 70 to permit workpiece loading and unloading.

Figures 12, 14:
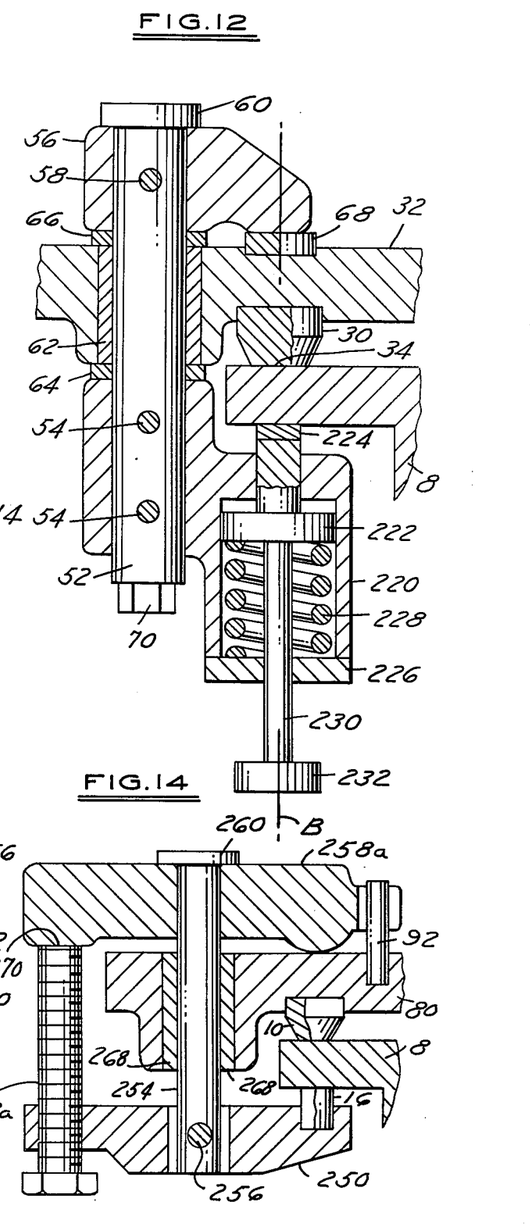
FIG. 12, a clamp similar to that of FIG. 9 with a spring actuator.
FIG. 14, a modification of the structure shown in FIG. 13 with a direct contact at one end of the double beam unit.

Another means of creating the clamp force is shown in FIG. 12. In this illustration, the yoke 220 is bored out with a cylindrical cavity in which is fitted a movable plunger 222 which carries a pressure pad 224. An annular cover 226 is mounted to the yoke 220, and a heavy compression spring 228 is mounted within the cavity of yoke 220 and between the plunger 222 and cover 226. A pull rod 230 is connected to plunger 222 and extends through spring 228 and the hole in cover 226. At its outer end, the rod 230 is formed into an enlarged head 232.

The mechanism in FIG. 12 is shown in the clamped position, with the clamp force generated by the spring 228, and with the reaction again on pad 68, creating only a compressive force on pallet frame 32.

To unclamp the workpiece, an external mechanism engages the rod head 232, and applies sufficient force to compress the spring 228 to a greater degree than in its clamped position; the pressure pad 224 moves clear of the workpiece 8 and the entire clamp assembly is rotated clear for workpiece loading and unloading. The clamp process is the inverted sequence of unclamping.

Figure 13:
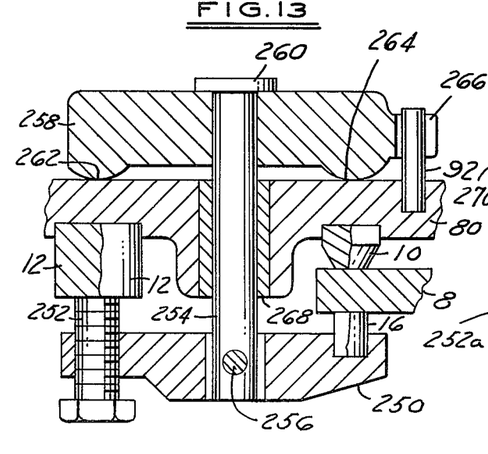
FIG. 13, a modified construction utilizing a double beam clamping structure.

A variation of the embodiment which uses a clamp bar and a reaction bar (as shown in FIG. 5) is shown in FIG. 13. In this variation, the clamping force is generated by a screw loaded in compression to create the clamp force, while the clamp bar and reaction bar are connected at a point between the clamp point and the screw axis.

Referring to FIG. 13, a section of the fixture or pallet frame 80 supports a locator pad 10 for the workpiece 8. The workpiece 8 is clamped against this locator pad 10 through a clamp bar 250 to which is mounted a clamp pad 16. The opposite end of the clamp bar 250 has threaded into it a load screw 252 which bears against the reaction pad 12 mounted in the frame 80.

On the clamp bar 250, at a point intermediate between the clamp pad 16 and the load screw 252, a reaction rod 254 is pivotally connected to the clamp bar 250 through a pin 256. This reaction rod 254 passes through the frame 80 and is held to a reaction bar 258 by a flanged head 260 on the reaction rod 254; the reaction rod 254 is therefore able to rotate with respect to the reaction bar 258. The reaction bar 258 is undercut between portions 262 and 264 which bear on the pallet frame 80 directly in line with the reaction pad 12 and the locator pad 10, respectively. The reaction bar 258 is prevented from rotating with respect to frame 80 by a pin 92 mounted in frame 80 and engaging a loose fitting slot 266 in one end of bar 258. The reaction rod 254 is supported in the frame 80 by a resilient bushing 268, or merely an oversize hole in frame 80.

It can be seen that as the screw 252 is rotated with respect to the clamp bar 250 and the pad 12 in a direction to move it towards the pad 12, that end of the bar 250 is forced to move away from the pad 12. This motion is reacted as a tension in the rod 254 and a clamp force is generated by pad 16 on workpiece 8. The tension force in rod 254 is reacted as a bending load in bar 258, but appears as two forces at the bearing points 262 and 264. It can be further seen that these forces are directly in line, respectively, with the forces on load screw 252 and clamp pad 16. Bars 250 and 258 will deflect in bending, but because of the alignment of the pressure points, this will impose no bending loads on the frame 80. As in the embodiment of FIG. 5, the only loads experienced by the frame 80 are two pure compressive loads, one along the clamping axis from contact point 264 through locator 10 and clamp pad 16, and the other along the reaction axis through contact point 262, through pad 12, and load screw 252.

The load screw 252 need not bear on pad 12 in frame 80 as shown in FIG. 13, but can bear directly on the reaction bar as shown in FIG. 14, which is otherwise identical to FIG. 13.

Referring to FIG. 14, the frame 80a does not extend to the reaction axis. A lengthened load screw 252a is threaded into the clamp bar 250; this screw 252a bears directly against a modified reaction bar 258a on a bearing face 270. The clamp force is generated by rotating the screw 252a towards the bar 258a which creates substantially the same force distribution as described for FIG. 13 except that the only force experienced by the frame 80a is now a single compressive load acting along the clamp axis through locator 10 and clamp pad 16.

For both the embodiments shown in FIGS. 13 and 14, the workpiece 8 is unclamped by retracting the screw 252 or 252a, respectively, and rotating the clamp beam 250 and rod 254 about the axis of rod 254, through an angle of about 45°–90° thereby providing clearance for unloading and reloading the fixture.

In connection with FIG. 13, it can be seen that the loading screw position can be inverted and be threaded into the reaction beam 258 to contact the frame 80 at the localized contact area 262, while a fixed locator pad on clamp bar 250 contacts the reaction pad 12. Similarly, in connection with FIG. 14, it can be seen that the load screw 252a can be threaded into the reaction beam 258a to bear against an associated surface on the clamp beam 250 on the line of action of screw 252a. In both cases, the inversion of the screw position does not affect the force and load distribution, but makes it possible to operate the clamp from the opposite side of the fixture or pallet from the workpiece position which is desirable for some applications.

It can be seen that the various features of these multiple embodiments can be combined to create other combinations which may be more suitable for specific applications.

I claim:

1. In a machine tool fixture in which a workpiece is located and clamped, a clamping system comprising:
   1. a frame,
   2. one or more locator surfaces mounted on said frame positioned for contacting an associated locating surface on said workpiece,
   3. one or more reaction surfaces, each associated with one of said locator surfaces and on said frame in a direction away from said workpiece and on an associated line of action substantially perpendicular to and passing through said associated locator surface, and in which a portion of said frame lies between each said reaction surface and said associated locator surface,
   4. a deflectable clamping means associated with a locator surface and mounted in said frame through non-rigid support means and comprising:
      a. a first pressure means contacting said workpiece on said associated line of action of said associated locator surface,
      b. a second pressure means contacting said associated reaction surface, and
      c. force means interconnecting said first pressure means and said second pressure means operable to create a relative displacement between said first pressure means and said second pressure means substantially along said associated line of action.

2. A clamping system as defined in claim 1 which includes a non-rigid support means comprising an elastomeric bushing mounted in said frame and in turn mounting said clamping means whereby deflection in said clamping means are negligibly transmitted as bending loads to said frame, and consequently impose negligible deflections of said frame.

3. A clamping system as in claim 1 in which said force means comprises a threaded member associated with one of said pressure means and a screw member associated with the other of said pressure means, whereby the rotation of said screw member relative to said threaded member decreases the distance between said pressure means.

4. A clamping system as in claim 1 in which said force means comprises a cylinder member associated with one of said pressure means, and a piston member associated with the other of said pressure means, whereby the introduction of fluid, under pressure into said cylinder displaces said piston and decreases the distance between said pressure means.

5. A clamping system as in claim 1 in which said force means comprises a spring connection between said pressure means biased to decrease the distance between said pressure means.

6. A clamping system as in claim 1 in which said first pressure means comprises one end of a clamp beam whose other end bears locally against said frame on a secondary line of action substantially parallel to said associated line of action, and in which said second pressure means comprises one end of a reaction beam whose other end bears locally against said frame on said secondary line of action, and said force means comprises a screw connection between said beams on a line of action intermediate said associated line of action and said secondary line of action, and substantially parallel therewith.

7. A clamping system as in claim 1 in which said force means comprises:
   1. a body member non-rigidly mounted in said frame along a line substantially parallel to and displaced from said associated line of action,
   2. a first cantilever member mounted on said body member and supporting one of said pressure means on said associated line of action,
   3. a second cantilever member mounted on said body member and supporting said other pressure means, and a force member associated with said second cantilever member, whereby said first pressure means and said second pressure means are displaceable towards each other substantially along said associated line of action.

8. A clamping system as in claim 1 in which said force means comprises:
   1. a body member non-rigidly mounted in said frame along a line substantially parallel to and displaced from said associated line of action,
   2. a first cantilever member mounted on said body member, a force member threaded into said first cantilever member on an axis substantially coincident with said associated line of action movable to actuate one of said pressure means, and 3. a second cantilever member mounted on said body member and supporting the other of said pressure means.

9. A clamping system as in claim 1 in which said force means comprises:
1. a body member non-rigidly mounted in said frame along a line substantially parallel to and displaced from said associated line of action,
2. a first cantilever member mounted on said body member, a force member threaded into said first cantilever member on an axis substantially coincident with said associated line of action movable to actuate said first pressure means, and
3. a second cantilever member mounted on said body member and supporting said second pressure means.

10. A clamping system as in claim 1 in which said force means comprises:
1. a body member non-rigidly mounted in said frame along a line substantially parallel to and displaced from said associated line of action,
2. a first cantilever member mounted on said body member and supporting said first pressure means, and
3. a second cantilever member mounted on said body member, and a force member threaded into said second cantilever member on an axis substantially coincident with said associated line of action movable to actuate said second pressure means.

11. A clamping system as in claim 1 in which said force means comprises:
1. a body member non-rigidly mounted in said frame along a line substantially parallel to and displaced from said associated line of action,
2. a first cantilever member mounted on said body member and supporting one of said pressure means on said associated line of action,
3. a second cantilever member mounted on said body member,
4. a lever member pivotally mounted on said second cantilever member and mounting the other of said pressure means, and
5. screw means operating between said body member and said lever member to vary the distance between said first and second pressure means.

12. A clamping system as in claim 1 in which said first pressure means comprises one end of a clamp beam and in which said second pressure means comprises one end of a reaction beam and the other end of one of said beams bears against said frame on a secondary line of action substantially parallel to and displaced from said associated line of action, and said force means comprises a screw member threaded into the other end of said other beam and acting on said secondary line of action and bearing against said frame, and said force means further comprises a tension member interconnecting said clamp beam and said reaction beam and passing through and non-rigidly mounted in said frame and acting on an axis substantially parallel to, coplanar with, and intermediate to said associated line of action and said secondary line of action.

13. A clamping system as in claim 1 in which said first pressure means comprises one end of a clamp beam, and in which said second pressure means comprises one end of a reaction beam, and in which said force means comprises a screw member threaded into the other end of one of said beams and bears against the other end of the other of said beams and wherein said screw member operates on a secondary line of action substantially parallel to and displaced from said associated line of action, and said force means further comprises a tension member interconnecting said clamp beam and said reaction beam and passing through and non-rigidly mounted in said frame and acting on an axis substantially parallel to, coplanar with, and intermediate to said associated line of action and said secondary line of action.

* * * * *